US008634083B2

(12) United States Patent
Igawa et al.

(10) Patent No.: US 8,634,083 B2
(45) Date of Patent: Jan. 21, 2014

(54) ORIGINAL DOCUMENT SIZE DETECTION DEVICE

(75) Inventors: Masaya Igawa, Shizuoka (JP); Satoshi Komatsu, Tokyo (JP); Hiroyuki Okada, Tokyo (JP); Koushi Takano, Tokyo (JP); Takao Sakurai, Tokyo (JP)

(73) Assignees: NEC AccessTechnica, Ltd., Shizuoka (JP); NEC Engineering, Ltd., Tokyo (JP)

( * ) Notice: Subject to any disclaimer, the term of this patent is extended or adjusted under 35 U.S.C. 154(b) by 0 days.

(21) Appl. No.: 13/586,426

(22) Filed: Aug. 15, 2012

(65) Prior Publication Data

US 2013/0044334 A1 Feb. 21, 2013

(30) Foreign Application Priority Data

Aug. 16, 2011 (JP) ................................ 2011-178064

(51) Int. Cl.
*G01B 11/02* (2006.01)

(52) U.S. Cl.
USPC ............................ 356/635; 356/608; 356/625

(58) Field of Classification Search
USPC .......... 356/607–608, 635–637, 640; 355/206, 355/208, 209; 358/488, 497, 499
See application file for complete search history.

(56) References Cited

U.S. PATENT DOCUMENTS 5,130,847 A * 7/1992 Tsujioka ...................... 358/473
5,218,408 A * 6/1993 Inada et al. .................. 399/376
5,225,688 A * 7/1993 Endo ....................... 250/559.24
5,281,803 A * 1/1994 Ishizuka ................... 250/208.1
5,453,818 A * 9/1995 Maehara et al. ............... 399/14
5,649,638 A * 7/1997 Roy et al. ..................... 220/4.26
5,940,049 A * 8/1999 Hinman et al. ................. 353/20
5,973,797 A * 10/1999 Tanaka et al. ................ 358/488
6,233,059 B1 * 5/2001 Kodaira et al. ................ 358/1.9
7,471,424 B2 * 12/2008 Ishido et al. ................. 358/449
2003/0043351 A1 * 3/2003 Ochi et al. ..................... 355/18
2011/0043873 A1 * 2/2011 Maruo ......................... 358/475

FOREIGN PATENT DOCUMENTS

JP 2001-346009 A 12/2001
JP 2004-126132 A 4/2004
JP 2004-258386 A 9/2004
JP 2006-261848 A 9/2006
JP 2007-139607 A 6/2007

OTHER PUBLICATIONS

Office Action issued by the Japanese Patent Office dated Jun. 5, 2013 in corresponding Application No. 2011-178064.

* cited by examiner

*Primary Examiner* — Sang Nguyen
(74) *Attorney, Agent, or Firm* — Sughrue Mion, PLLC

(57) ABSTRACT

An original document size detection device of the present invention is characterized by comprising a document reading table, a light source which irradiates an original document placed on the document reading table, a cover body which covers the original document, a light detection unit which detects a reflected light that a light from the light source is reflected by the original document and an external light that enters the surface of the document reading table when the cover body is lifted, a masking unit which masks an output signal based on the external light in the output signal of the light detection unit based on the reflected light and the external light, and a determination unit which determines a size of the original document in a main scanning direction based on the output signal of the light detection unit that is masked by the masking unit.

2 Claims, 15 Drawing Sheets

| | COVER BODY OPENING ANGLE > $\alpha_1$ | COVER BODY OPENING ANGLE = $\alpha_1$ | COVER BODY OPENING ANGLE = $\alpha_2$ | COVER BODY OPENING ANGLE = 0 |
|---|---|---|---|---|
| FIRST PHOTO SENSOR | LIGHT RECEIVING STATE | CHANGE FROM LIGHT RECEIVING STATE TO LIGHT SHIELDING STATE | CHANGE FROM LIGHT SHIELDING STATE TO LIGHT RECEIVING STATE | LIGHT RECEIVING STATE |
| SECOND PHOTO SENSOR | LIGHT RECEIVING STATE | LIGHT RECEIVING STATE | LIGHT SHIELDING STATE | LIGHT SHIELDING STATE |
| THIRD PHOTO SENSOR | LIGHT RECEIVING STATE | LIGHT RECEIVING STATE | LIGHT RECEIVING STATE | LIGHT SHIELDING STATE |

| | COVER BODY OPENING ANGLE > $\alpha_1$ | COVER BODY OPENING ANGLE = $\alpha_1$ | COVER BODY OPENING ANGLE = $\alpha_2$ | COVER BODY OPENING ANGLE = 0 |
|---|---|---|---|---|
| FIRST PHOTO SENSOR | LIGHT SHIELDING STATE | CHANGE FROM LIGHT SHIELDING STATE TO LIGHT RECEIVING STATE | CHANGE FROM LIGHT RECEIVING STATE TO LIGHT SHIELDING STATE | LIGHT SHIELDING STATE |
| SECOND PHOTO SENSOR | LIGHT SHIELDING STATE | LIGHT SHIELDING STATE | LIGHT RECEIVING STATE | LIGHT RECEIVING STATE |
| THIRD PHOTO SENSOR | LIGHT SHIELDING STATE | LIGHT SHIELDING STATE | LIGHT SHIELDING STATE | LIGHT RECEIVING STATE |

3
7
13
LIGHT SOURCE
24
5
DETERMINATION UNIT
4
MASKING UNIT
25
LIGHT DETECTION UNIT

Fig.2A

| | COVER BODY OPENING ANGLE > $\alpha_1$ | COVER BODY OPENING ANGLE = $\alpha_1$ | COVER BODY OPENING ANGLE = $\alpha_2$ | COVER BODY OPENING ANGLE = 0 |
|---|---|---|---|---|
| FIRST PHOTO SENSOR | LIGHT RECEIVING STATE | CHANGE FROM LIGHT RECEIVING STATE TO LIGHT SHIELDING STATE | CHANGE FROM LIGHT SHIELDING STATE TO LIGHT RECEIVING STATE | LIGHT RECEIVING STATE |
| SECOND PHOTO SENSOR | LIGHT RECEIVING STATE | LIGHT RECEIVING STATE | LIGHT SHIELDING STATE | LIGHT SHIELDING STATE |
| THIRD PHOTO SENSOR | LIGHT RECEIVING STATE | LIGHT RECEIVING STATE | LIGHT RECEIVING STATE | LIGHT SHIELDING STATE |

Fig.2B

| | COVER BODY OPENING ANGLE > $\alpha_1$ | COVER BODY OPENING ANGLE = $\alpha_1$ | COVER BODY OPENING ANGLE = $\alpha_2$ | COVER BODY OPENING ANGLE = 0 |
|---|---|---|---|---|
| FIRST PHOTO SENSOR | LIGHT SHIELDING STATE | CHANGE FROM LIGHT SHIELDING STATE TO LIGHT RECEIVING STATE | CHANGE FROM LIGHT RECEIVING STATE TO LIGHT SHIELDING STATE | LIGHT SHIELDING STATE |
| SECOND PHOTO SENSOR | LIGHT SHIELDING STATE | LIGHT SHIELDING STATE | LIGHT RECEIVING STATE | LIGHT RECEIVING STATE |
| THIRD PHOTO SENSOR | LIGHT SHIELDING STATE | LIGHT SHIELDING STATE | LIGHT SHIELDING STATE | LIGHT RECEIVING STATE |

43
10
7
13
1
26
24
23
22
25
26
26
26

28
1
7
22
13
3

ORIGINAL DOCUMENT SIZE DETECTION DEVICE

This application is based upon and claims the benefit of priority from Japanese Patent Application No. 2011-178064, filed on Aug. 16, 2011, the disclosure of which is incorporated herein in its entirety by reference.

TECHNICAL FIELD

The present invention relates to an original document size detection device.

BACKGROUND ART

A device such as a copier, a facsimile machine, or the like has an image reading unit. The image reading unit includes an optical module. The optical module includes for example, a light source, a photoelectric conversion element (for example, a CCD), a plurality of mirrors, and a lens. The light source irradiates an original document placed on a document reading table. The light emitted by the light source is reflected by the original document and the reflected light is reflected by a mirror to lead it to the CCD. The lens is disposed between the mirror and the CCD, concentrates the light reflected by the mirror, and forms an image on the CCD. A wire is connected to the both ends of the optical module. A drum around which the wire is wound is driven by rotation of a motor. Whereby, the wire is spooled, the optical module is pulled in a sub-scanning direction (the sub-scanning direction is perpendicular to a main scanning direction), and the optical module is moved parallel to the original document in the sub-scanning direction. By this, the image is read. When a cover body of an ADF unit (automatic document feeder) is closed after the original document is placed on the document reading table, the image reading unit detects (determines) the size of the original document in both the main scanning direction and the sub-scanning direction (the width and the length of the original document are detected). Namely, the size such as A4 size, A3 size, B4 size, or the like of the original document placed on the document reading table is determined.

The size of the original document in the main scanning direction (the length of the original document) is detected/determined based on a change in an output waveform of the CCD that appears at a certain position when the optical module reads the original document in the main scanning direction. The output waveform of the CCD greatly changes at a boundary between an area in which the original document exists and an area in which it does not exist when the original document is read in the main scanning direction. Namely, because the output waveform of the CCD greatly changes at the boundary, it can be known that the position at which the output waveform of the CCD greatly changes is the position of the edge of the original document.

A size sensor disposed to a rail in the sub-scanning direction on which the optical module moves is used for the detection of the size of the original document in the sub-scanning direction. A photo sensor composed of a pair of units (a light emission unit and a light reception unit) is used for the size sensor. The original document is detected by the size sensor as follows. The light emission unit of the size sensor emits the light, the original document is irradiated with the light, the light is reflected by the original document, and when the light reception unit of the size sensor receives the reflected light, it is determined that the original document exists. When the reflected light from the original document is not received by the light reception unit of the size sensor, it is determined that the original document does not exist. The size sensor is composed of a plurality of photo sensors (for example, two photo sensors). The size of the original document in the sub-scanning direction is determined based on the combination of the signals from two photo sensors.

The basic technology method for detecting (determining) the size of the original document placed on the document reading table has been explained above. When the sizes of the original document in both the main scanning direction and the sub-scanning direction are detected, a specific opening angle (closing angle) of the cover body of the ADF unit is used as a trigger. For this reason, a cover body angle detection mechanism is provided in a device in order to achieve the detection of the size of the original document when the closing angle of the cover body reaches the set angle (the specific closing angle).

In the document size detection device disclosed in Japanese Patent Application Laid-Open No. 2004-126132 (hereinafter, patent document 1), in order to improve accuracy of detection of the size of the original document in the main scanning direction in which countermeasures against external light are provided for the detection of the size of the original document, the detection of the size of the original document in the main scanning direction is achieved when the closing angle of the cover body reaches a certain angle when the cover body is closed. The light source of the optical module is turned off just before achieving the detection of the size of the original document in the main scanning direction, the output of the CCD is read while keeping this state, an incident position of the external light is detected, and this is removed. As a result, the influence of the external light is removed.

In the document size detecting device disclosed in Japanese Patent Application Laid-Open No. 2004-258386 (hereinafter, patent document 2), a scanner controller detects two opening angles, that are a first stage opening angle and a second stage opening angle, of the original document pressing plate based on a state of the optical sensor and when the detected angle is within a range of the first stage opening angle, it turns on a power supply of the light source, the CCD, and an original document size detection sensor as an original document size detection preparation process. Next, when the opening angle of the original document pressing plate is within a range of the second stage opening angle, the size of the original document in the sub-scanning direction is determined, it is determined whether or not the reflected light from the original document exists based on a threshold value set in advance, and when it is determined that the reflected light exists at a point, it is determined that the original document exists at the point. As a result, because the size of the original document can be detected at a low opening angle of the original document pressing plate and the most suitable angle in accordance with a closing operation of the original document pressing plate performed by a user, the original document size detection can be correctly performed while reducing an erroneous detection due to the external light.

In Japanese Patent Application Laid-Open No. 2007-139607 (hereinafter, patent document 3), a sensor mounting structure characterized in that a pair of transmission and reception vibrators are held in a housing hole or by a housing holder in a point-contact manner (or in a very light contact manner similar to the point-contact manner) is disclosed. By this structure, the vibration of the transmission/reception vibrators is less likely to be transmitted to the housing hole or the housing holder and whereby, a surface acoustic wave generated by one of the transmission/reception vibrators is less likely to be transmitted to the other transmission/reception vibrator (it is less likely to act as disturbance).

However, in the device disclosed in patent document 1, the CCD output is read twice, one is performed in a state in which the light source is not turned on and the other is performed in a state in which the light source is turned on, in a short time until the lifted cover body is closed. For this reason, when the cover body is quickly closed by an operator, the original document detection cannot follow the lid closing speed and whereby, a false detection occurs. Usually, it takes several milliseconds to several tens of milliseconds until the CCD or the light source for the optical module stably operates after the power is turned on. Moreover, because the number of times of reading the CCD output increases, a software process becomes complicated. In patent document 2 or 3, means to solve the above-mentioned problem are not disclosed.

SUMMARY

An object of the present invention is to provide an original document size detection device which can easily and correctly determine a size of an original document in a main scanning direction.

BRIEF DESCRIPTION OF THE DRAWINGS

Exemplary features and advantages of the present invention will become apparent from the following detailed description when taken with the accompanying drawings in which:

FIG. 2 is a figure showing a relation between a photo sensor and a cover body opening angle.

EXEMPLARY EMBODIMENT

Next, a detailed explanation will be given for a first exemplary embodiment with reference to the drawings.

The original document size detection device according to the present invention is installed in an image reading device such as for example, a facsimile machine, a copier, a complex machine, or the like. However, it is not limited to these devices.

The original document size detection device according to the present invention has a function to automatically detect the sizes of the original document in the main scanning direction and the sub-scanning direction by an image reading device (for example, the image reading device has the cover body which can be opened and closed on the document reading table and reads an image of the original document placed on the document reading table by moving the CCD arranged in the main scanning direction of the original document in the sub-scanning direction).

Figure 1:
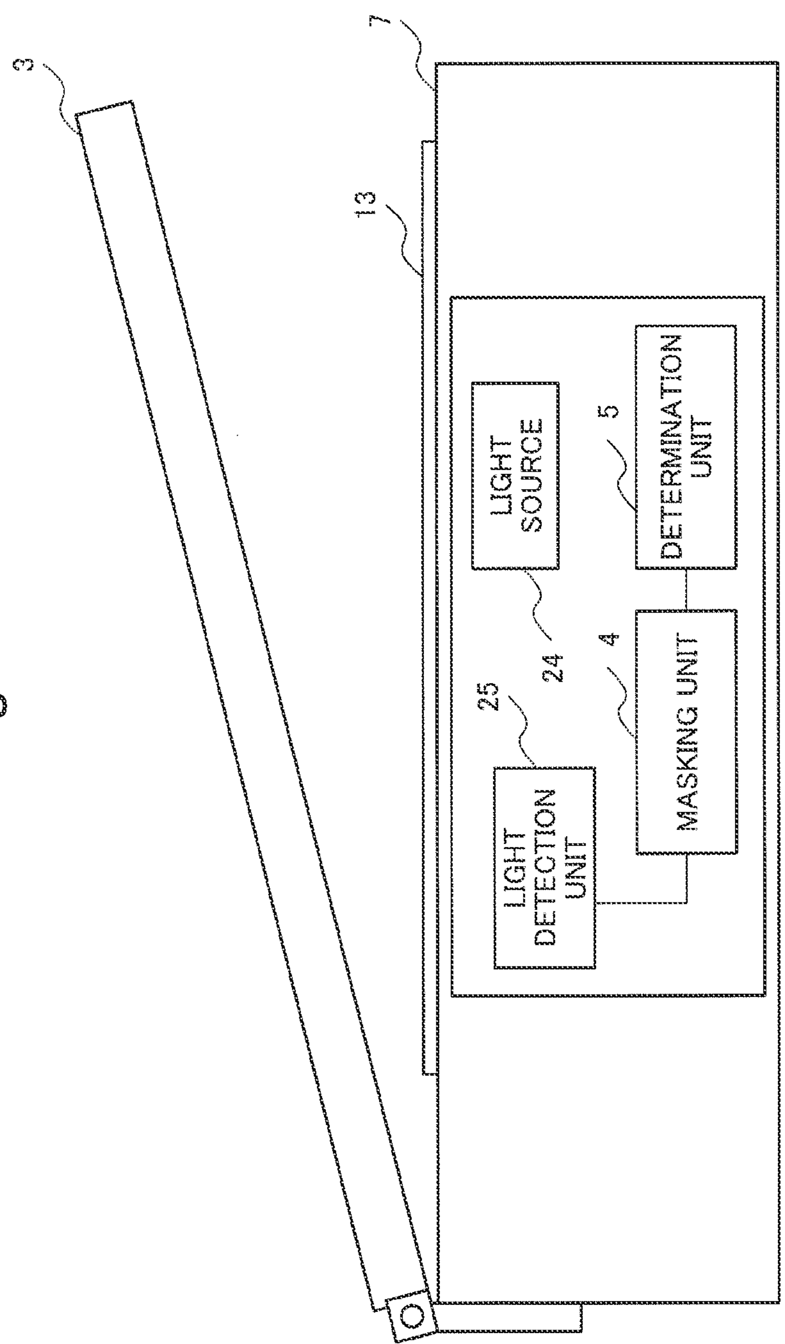
FIG. 1 is a block diagram of an original document size detection device.

FIG. 1 is a block diagram of an original document size detection device according to the present invention. The original document size detection device according to the present invention comprises a document reading table 7, a light source 24 which irradiates an original document 13 placed on the document reading table 7, a cover body (a document lid) 3 which covers the original document 13 placed on the document reading table 7, a light detection unit (for example, a CCD) 25 which detects a light that is emitted by the light source 24 and reflected by the original document 13 placed on the document reading table 7 and an external light entering the surface of the document reading table 7 when the cover body 3 is lifted, a masking unit 4 which masks an output signal based on the external light in an output signal of the light detection unit (CCD) 25 based on the reflected light and the external light, and a determination unit 5 which determines a size of the original document 13 in the main scanning direction based on the output signal of the light detection unit 25 that is masked by the masking unit 4.

Figure 15:
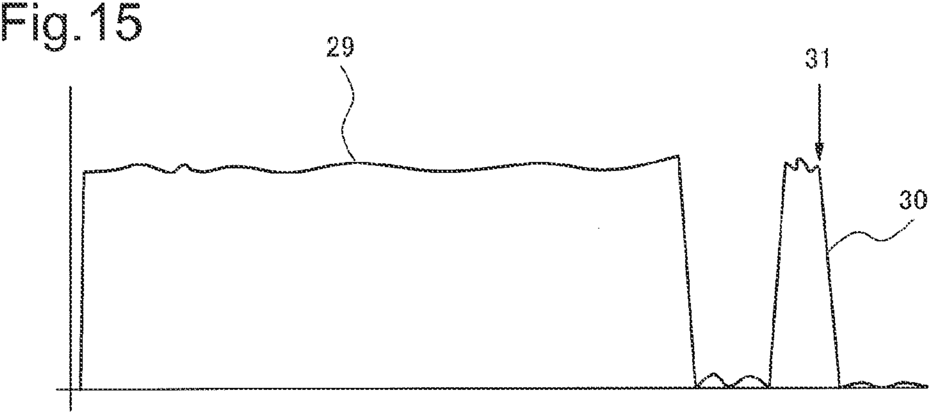
FIG. 15 shows a CCD output when an external light enters a surface of a document reading table of an original document size detection device.

In the present invention, the masking unit 4 is an essential component. That is because when the external light enters the surface of the document reading table, there is a high possibility that the size of the original document is erroneously determined. For example, when the external light enters the surface of the document reading table and the masking unit 4 is not used, the output signal of the light detection unit (CCD) 25 is shown in FIG. 15. In this case, the reason, either the original document 13 placed on the document reading table 7 is colored in black or the external light enters the surface of the document reading table 7, why the output signal shown in FIG. 15 is obtained cannot be known. Namely, it is difficult to correctly determine the size of the original document.

The masking unit 4 facilitates correct determination of an original document end corresponding portion (a output waveform end portion) 29*a* with respect to information (a CCD output waveform 29) obtained by performing a photoelectric conversion of the light reflected by the original document 13 that is read by the CCD 25. When the masking unit 4 performs an electric process to the CCD output information, a desired area of the CCD output waveform 29 is masked. The size of the original document 13 in the main scanning direction is determined based on the CCD output information masked by the masking unit 4.

The masking unit 4 is configured as follows. For example, the masking unit 4 masks an output signal in an area that corresponds to an area between a position between the edge of the original document having the maximum width in the main scanning direction and the edge of the original document having a width that is one size smaller than the maximum width and a maximum reading position in the main scanning direction. The area masked by the masking unit 4 is the area in which the output signal based on the external light is generated when the cover body 3 is lifted by a certain opening angle (the opening angle of the cover body 3 at which the size of the original document in the main scanning direction is determined: for example, α2, mentioned later) and the external light enters the surface of the document reading table 7. Further, the masking area can be determined by checking the CCD output signal caused by the incident external light in advance when the cover body 3 is lifted by the certain opening angle.

The determination unit 5 is a computer for example, a CPU. For example, the determination unit 5 operates as follows. When the output signal of the light detection unit 25 that is masked by the masking unit 4 remains in a High state in the masking area, it is determined that the size of the original document 13 in the main scanning direction is maximum. When the output signal of the light detection unit 25 that is masked by the masking unit 4 does not remain in the High state in the masking area, it is determined that the size of the original document 13 in the main scanning direction is a size corresponding to a position at which the output signal changes from the High state to the Low state.

The original document size detection device of the present invention will be described in detail below. The original document size detection device has at least the above-mentioned configuration. Namely, the original document size detection device comprises the document reading table, the light source which irradiates the original document placed on the document reading table, the cover body which covers the original document placed on the document reading table, the light detection unit which detects a light that is emitted by the light source and reflected by the original document placed on the document reading table and an external light entering the surface of the document reading table when the cover body is lifted, the masking unit which masks the output signal based on the external light in the output signal of the light detection unit based on the reflected light and the external light, and the determination unit which determines the size of the original document in the main scanning direction based on the output signal of the light detection unit that is masked by the masking unit. Therefore, the original document size detection device which can easily and correctly determine the size of the original document in the main scanning direction can be provided.

Figure 3:
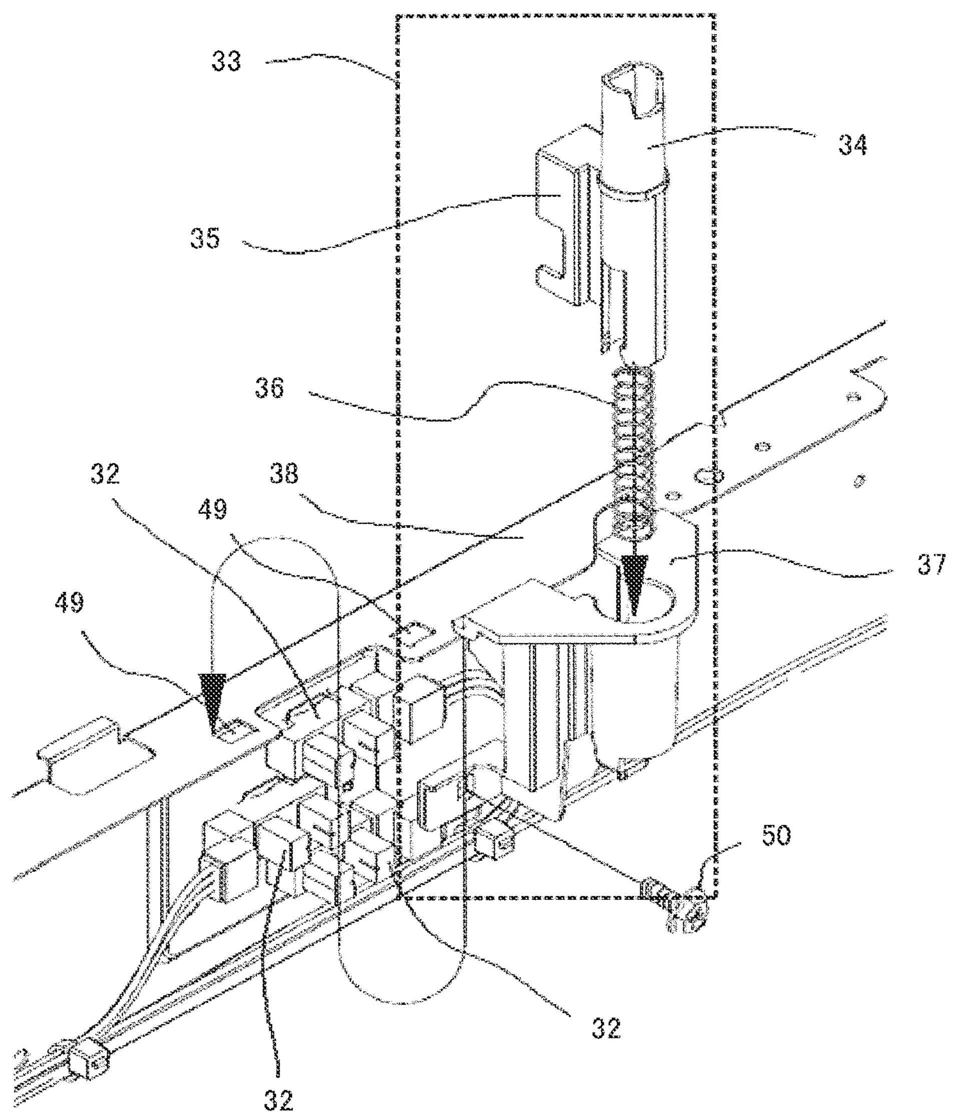
FIG. 3 is an explanatory drawing showing a method for mounting an actuator unit that acts as a cover body angle detection mechanism.

The actuator unit 33 is provided as the opening angle detection mechanism of the cover body 3. The actuator unit 33 is configured for example, as shown in FIG. 3.

Figure 6:
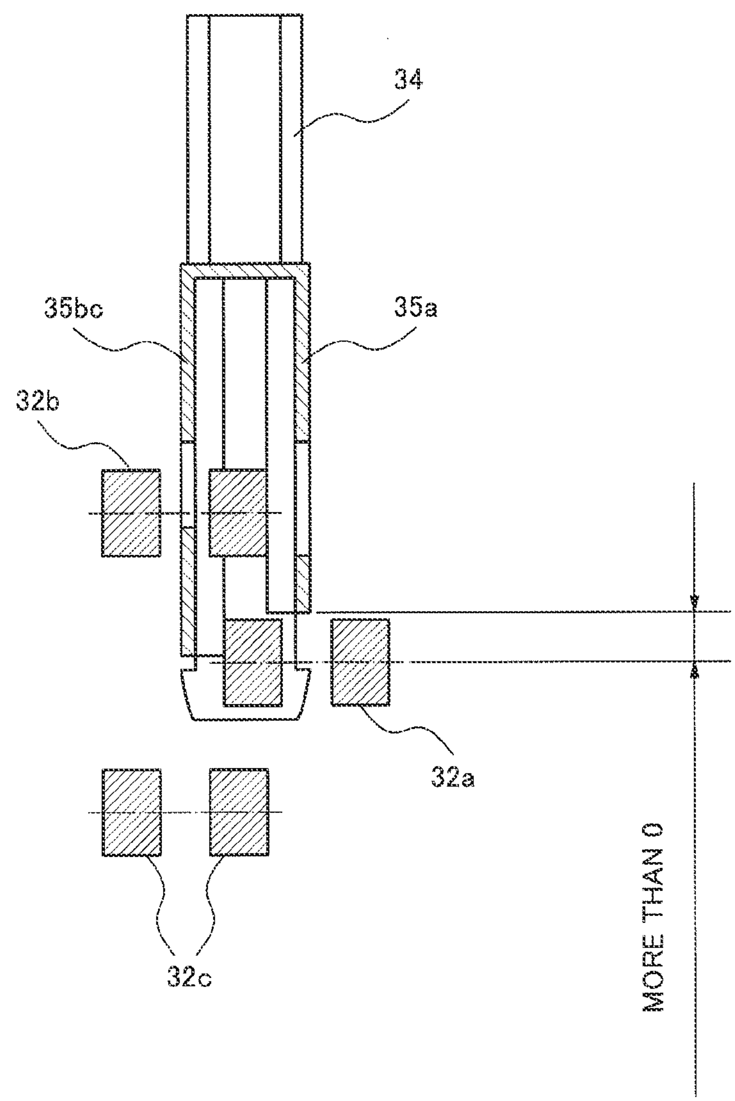
FIG. 6 is an explanatory drawing showing a relation between a transmissive photo sensor and a shield plate when a cover body opening angle $\alpha>18$ degrees.

The actuator unit 33 includes the shield plates 35 (a first shield plate 35*a* and a second shield plate 35*bc*) for blocking (intercepting) or transmitting (receiving) the light of the transmissive photo sensor 32. Further, the actuator unit 33 includes the base 37, a rod 34, and a spring 36. The rod 34 is upwardly urged by the spring 36. When the cover body 3 is in a closed state or in a closing state, it is in contact with the end of the rod 34. Accordingly, the position of the rod 34 in a vertical direction relates to the closing angle (the opening angle) of the cover body 3. Namely, the rod 34 moves up and down in conjunction with the opening/closing operation of the cover body 3. However, in a state in which the cover body 3 is greatly opened by for example, 90 degrees (an angle smaller than 90 degrees may be applied), even when a pressing pressure from the cover body 3 side does not act on the upper end of the rod 34 and an upward urging force is applied to the rod 34 by the spring 36, the rod 34 does not come off. In order to perform this operation, for example, a structure in which a part of the actuator unit 33 is latched at a proper position of the base 37 or the chassis 38 and whereby, the rod 34 cannot move upward any more is used. For example, a structure in which the shield plates 35 (35*a* and 35*bc*) cannot move upward from a position shown in FIG. 6 is used.

Three transmissive photo sensors 32 (32*a*, 32*b*, and 32*c*) attached to the chassis 38 are sandwiched between the base 37 of the actuator unit 33 and the chassis 38 in order to prevent the rise of three transmissive photo sensors 32 (32*a*, 32*b*, and 32*c*). By this, even when an external force (for example, dropping) is applied to the transmissive photo sensors 32 at the time of the transport, the trouble such as the coming-off or the dropping of the transmissive photo sensors 32 hardly occurs.

Figure 4:
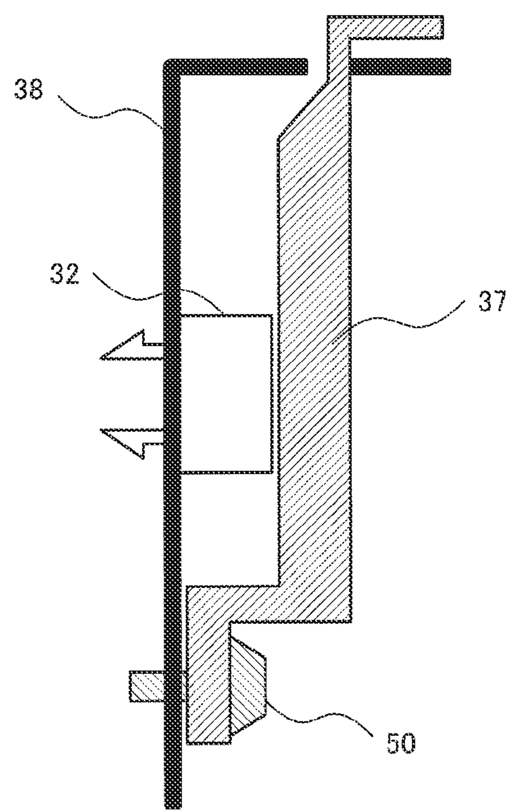
FIG. 4 is a side view showing a method for mounting a transmissive photo sensor.
Figure 5:
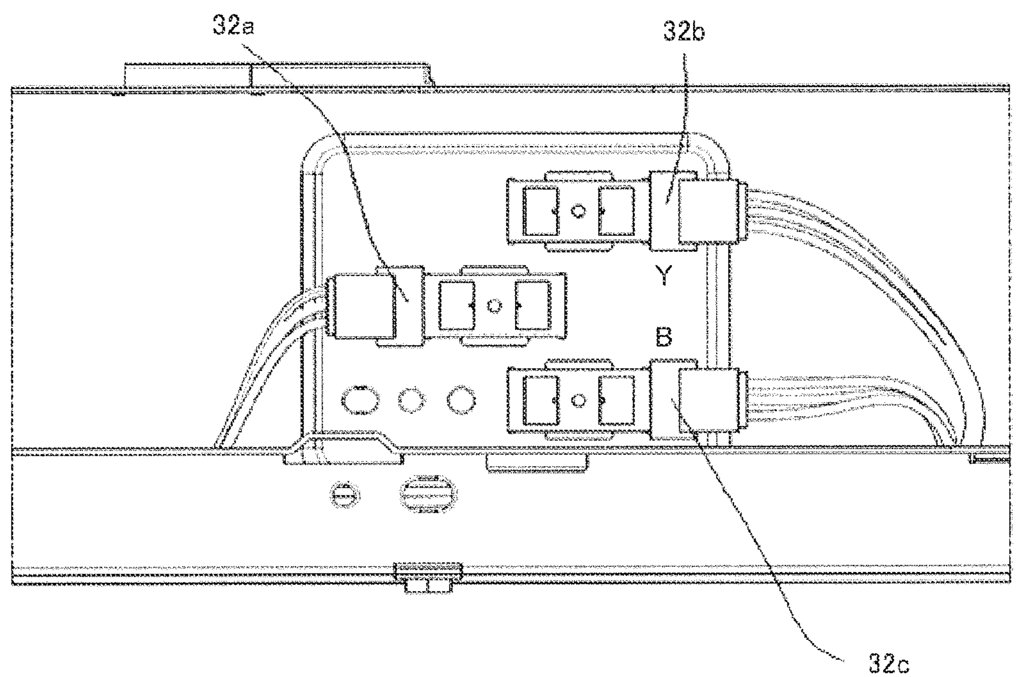
FIG. 5 is a front view showing a method for mounting a transmissive photo sensor.

In more detail, the transmissive photo sensor 32 is fixed as follows. As shown in FIG. 4, a hole is provided to a chassis 38. A latching claw of the transmissive photo sensor 32 is inserted in this hole. By this, the transmissive photo sensor 32 is latched (fixed) to the chassis 38. If the transmissive photo sensor 32 is used in this condition, there is a possibility that the latching claw is unlatched by an external force because the transmissive photo sensor 32 is only hooked in the hole by the latching claw. To prevent this problem, a base 37 of the actuator unit 33 including two shield plates 35 is pushed so as to make contact with the transmissive photo sensor 32. Whereby, the actuator unit 33 is inserted into a hole 49 of the chassis 38. Namely, the transmissive photo sensor 32 is disposed so that it is sandwiched between the base 37 and the chassis 38. After this, the actuator unit 33 is fixed to the chassis 38 with a screw 50. By using the above-mentioned structure, the transmissive photo sensor 32 is firmly fixed to the chassis 38 without looseness.

It is desirable that the first photo sensor 32*a*, the second photo sensor 32*b*, and the third photo sensor 33*b* are arranged on the different lines in the vertical direction. It is desirable that the second photo sensor 32*b* and the third photo sensor 33*c* are arranged at the positions whose heights are different from each other on the same line in the vertical direction.

In this device, three photo sensors are operated according to the opening angle (closing angle) of the cover body 3 as shown in the operation table of FIG. 2A or FIG. 2B. For example, with the closing operation of the cover body 3, three photo sensors are operated by a shield plate 35 according to the operation table of FIG. 2A or FIG. 2B. The determination unit 5 determines the size of the original document 13 in the sub-scanning direction based on the output signal of the light detection unit 25 when the opening angle (closing angle) of the cover body 3 is α1. The size of the original document 13 in the main scanning direction is determined when the opening angle (closing angle) of the cover body 3 is α2 (α1>α2). By using the above-mentioned configuration, only one interrupt port is enough for the detection of the cover body angle. In the original document size detection device according to the present invention, an angle range between 5 and 25 degrees is desirable for the angle α1 and the angle range between 12 and 22 degrees is further desirable for the angle α1. The angle range between 4 and 24 degrees is desirable for the angle α2 and the angle range between 8 and 18 degrees is further desirable for the angle $\alpha 2$. Here, $\alpha 1 > \alpha 2$. The angle range between 1 and 10 degrees is desirable for the angle of ($\alpha 1 - \alpha 2$) and the angle range between 4 and 8 degrees is further desirable for the angle of ($\alpha 1 - \alpha 2$). The reason that the above-mentioned range is desirable is described below. When the angle $\alpha 1$ is too large, for example, the influence of the external light becomes excessive and there is a high possibility that the size of the original document is erroneously detected. When the angle $\alpha 2$ is too small, a transition time from the original document size detection operation to the next operation is too short and whereby, there is a high possibility that the size of the original document is erroneously detected. As a result of various experiments, when the angle is within the above-mentioned range, there was a small possibility that the size of the original document is erroneously detected.

Namely, the opening angle (the closing angle) of the cover body 3 is set so that the output signal due to the external light 28 can be masked.

For the purpose of accuracy improvement of the original document size detection in the main scanning direction in which the countermeasure against the external light is taken for the original document size detection, in patent document 1, when the cover body is closed, the size in the main scanning direction is detected when the angle of the cover body reaches a predetermined angle. The light source of the optical module is turned off just before detecting the size of the original document in the main scanning direction and after this, the CCD output is read, an incident position of the external light is detected, and this is removed. By this, the influence of the external light is removed. However, in the device disclosed in patent document 1, the CCD output is read twice, one is performed in a state in which the light source is turned off and the other is performed in a state in which the light source is turned on, in a short time until the lifted cover body is closed. For this reason, when the cover body is quickly closed by the operator, the original document detection cannot follow the lid closing speed and whereby, a false detection occurs. Usually, it takes several milliseconds to several tens of milliseconds until the CCD or the light source for the optical module stably operates after the power is turned on. Moreover, because the number of times of reading the CCD output increases, a software process becomes complicated.

In contrast, in the device according to the present invention, the angle of the cover body is set so that the output signal in an area that corresponds to the area on the surface of the document reading table which the external light enters is masked by the electric masking process. Accordingly, it is not necessary to confirm the CCD output in advance in order to detect the incident position of the external light 28. In a process for confirming the CCD output waveform for original document size detection in the main scanning direction, the masking process is performed by deleting only the output waveform data in an area that corresponds to the external light incident area. Therefore, a load on software control for deleting the data in the area that corresponds to the external light incident area does not become especially large. Of course, because the data in the area that corresponds to the external light incident area is excluded by the masking, the influence of the external light 28 can be removed. Accordingly, the influence of the external light is removed by performing a few process and the original document size detection determination can be performed with high accuracy.

In the original document size detection device according to the present invention, it is desirable that when the closing angle of the cover body 3 is equal to the angle $\alpha 1$, the light source 24 is turned on. A configuration in which the reflected light is detected by the light detection unit 25 and the determination unit 5 determines the size of the original document based on the output signal of the light detection unit 25 is used.

The first shield plate 35*a* and the second shield plate 35*bc* have a notch. The first photo sensor 32*a* is operated according to the operation table of FIG. 2A (or FIG. 2B) by the operation of the first shield plate 35*a* with the notch. The second photo sensor and the third photo sensor 32*c* are operated according to the operation table of FIG. 2A (or FIG. 2B) by the operation of the second shield plate 35*bc* with the notch.

Three transmissive photo sensors 32 (the first photo sensor 32*a*, the second photo sensor 32*b*, and the third photo sensor 32*c*) and two shield plates 35 (35*a* and 35*bc*) are configured as follows. The second photo sensor 32*b* and the third photo sensor 32*c* are disposed at a side of the first photo sensor 32*a*. The second photo sensor 32*b* and the third photo sensor 32*c* are disposed on the same line in the vertical direction. The shield plate 35*a* with the notch is disposed at a location corresponding to the first photo sensor 32*a*. The shield plate 35*a* that moves upward and downward blocks (intercepts) or transmits (receives) the light of the first photo sensor 32*a* according to the position (the height) of the shield plate 35*a*. The shield plate 35*bc* with the notch is disposed at a location corresponding to the second photo sensor 32*b* and the third photo sensor 32*c*. The shield plate 35*bc* that moves upward and downward blocks (intercepts) or transmits (receives) the lights of the second photo sensor 32*b* and the third photo sensor 32*c* according to the position (the height) of the shield plate 35*bc*. In particular, as shown in FIG. 6, the shield plate 35 and the transmissive photo sensor 32 are disposed (arranged) so that the shield plates 35 (35*a* and 35*bc*) does not block (intercept) the lights of the transmissive photo sensors 32 (the first photo sensor 32*a*, the second photo sensor 32*b*, and the third photo sensor 32*c*) when the cover body 3 is sufficiently lifted.

Figure 7:
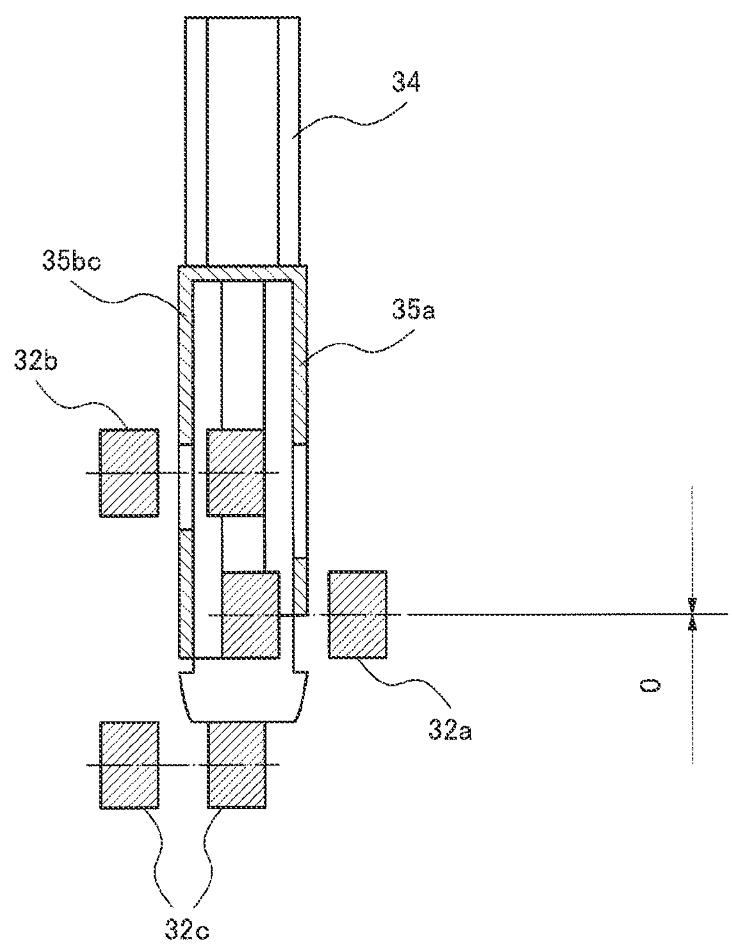
FIG. 7 is an explanatory drawing showing a relation between a transmissive photo sensor and a shield plate when a cover body opening angle $\alpha=18$ degrees.

The shield plate 35 and the transmissive photo sensors 32 are disposed (arranged) so that the positional relationship shown in FIG. 7 is obtained when the cover body opening angle is equal to the angle $\alpha 1$ (for example, 18 degrees) when the cover body 3 is closed. Namely, the shield plate 35*a* is disposed (arranged) so as to start to block (intercept) the light of the first photo sensor 32*a*. Further, the shield plate 35*bc* is disposed (arranged) so as not to block (intercept) the light of the second photo sensor 32*b* and the third photo sensor 32*c*.

Figure 8:
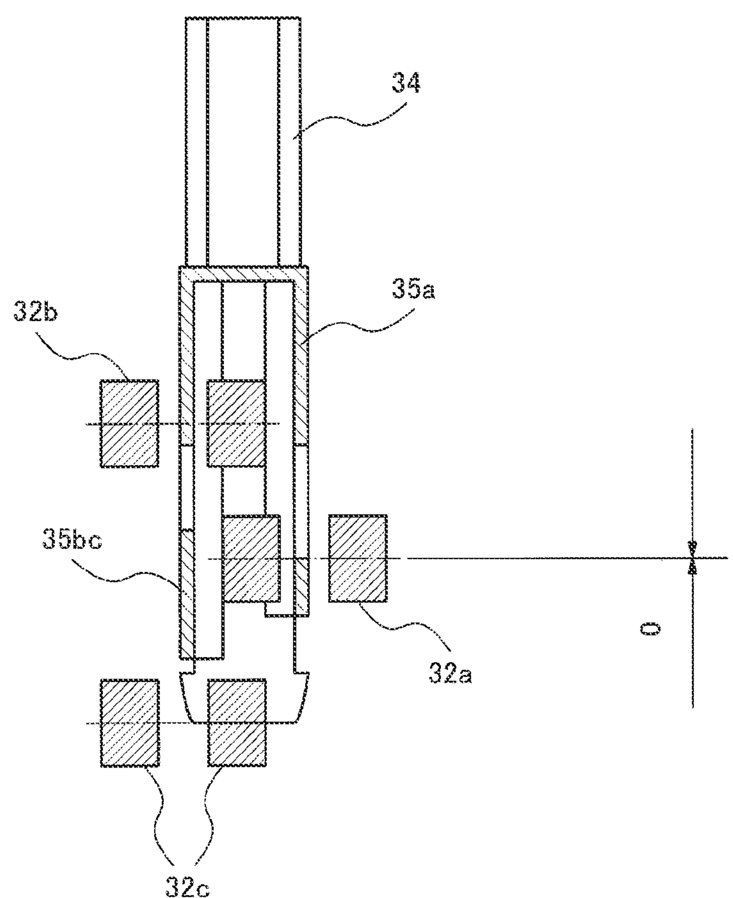
FIG. 8 is an explanatory drawing showing a relation between a transmissive photo sensor and a shield plate when a cover body opening angle $\alpha=12$ degrees.

When the cover body 3 is further closed, the shield plate 35 and the transmissive photo sensor 32 are disposed (arranged) so that the positional relationship shown in FIG. 8 is obtained when the cover body opening angle is equal to the angle $\alpha 2$ (for example, 12 degrees). Namely, because the light of the first photo sensor 32*a* starts to pass through the notch of the shield plate 35*a*, the state of the first photo sensor 32*a* changes from a light shielding (blocking) state to the light receiving state and the state of the second photo sensor 32*b* changes from the light receiving state to the light shielding (blocking) state by the shield plate 35*bc*. However, the third photo sensor 32*c* still remains in the light receiving state.

Figure 9:
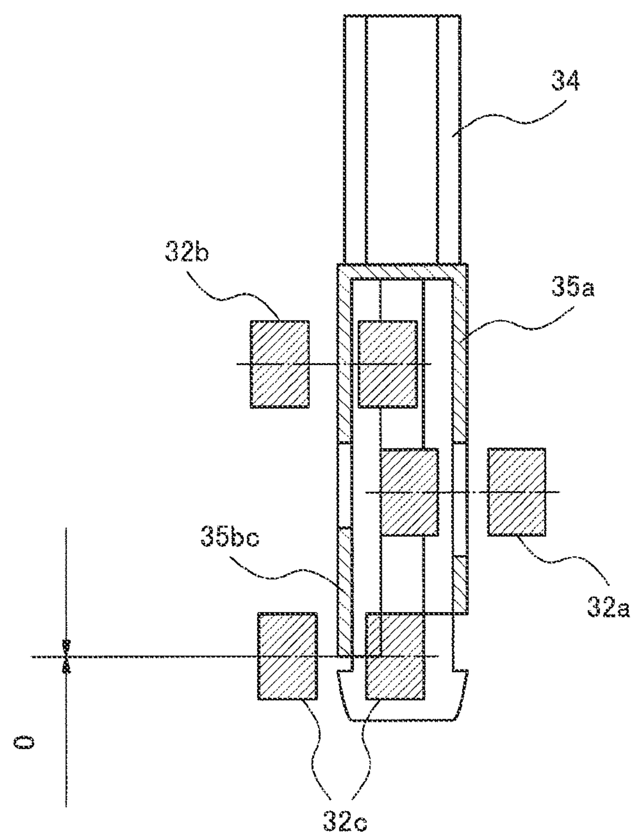
FIG. 9 is an explanatory drawing showing a relation between a transmissive photo sensor and a shield plate when a cover body opening angle $\alpha=0$ degree.
Figure 10:
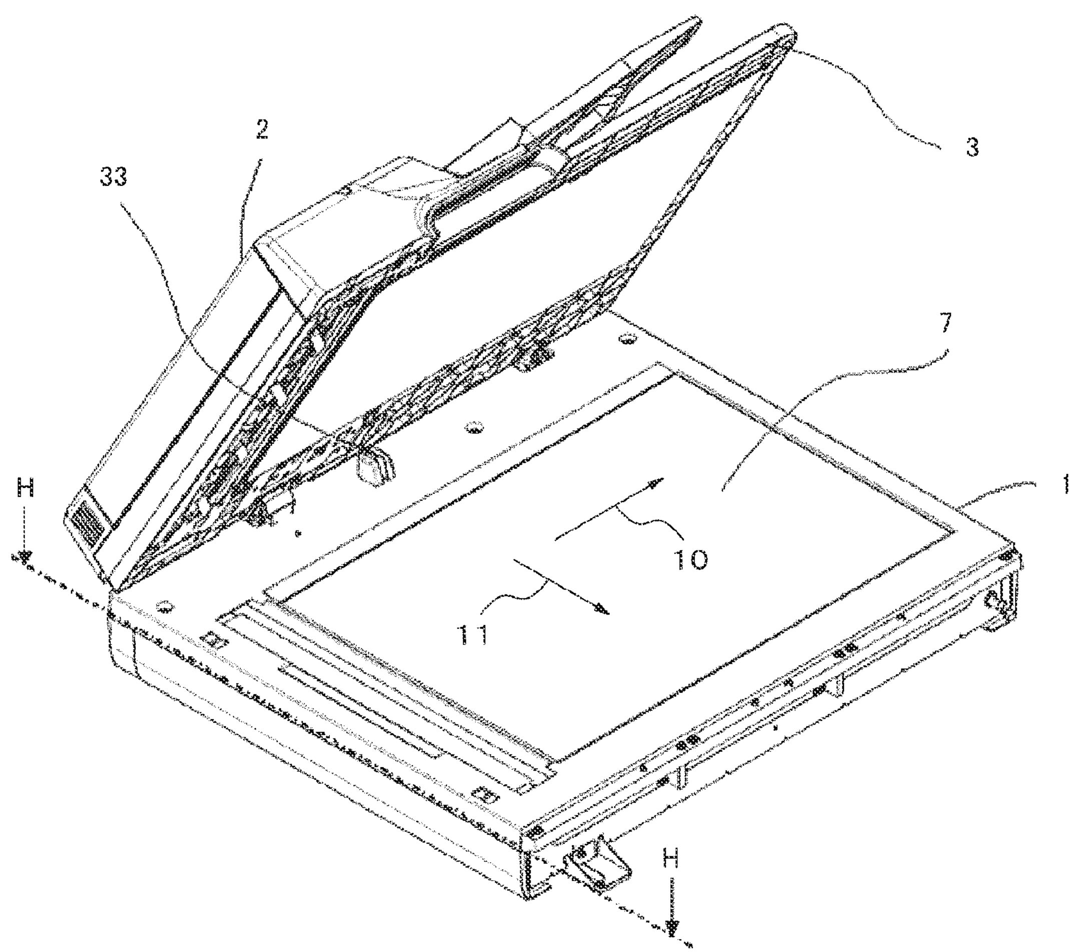
FIG. 10 is a schematic perspective view of an original document size detection device in a cover body open state.
Figure 11:
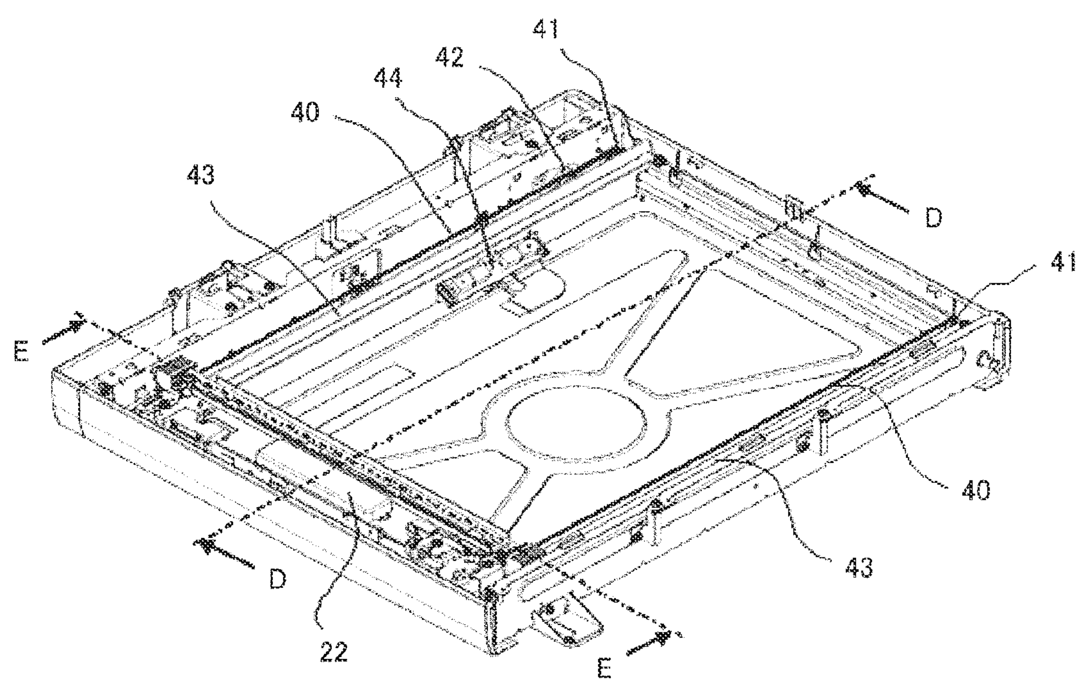
FIG. 11 is a schematic perspective view showing an internal mechanism of an original document size detection device.
Figure 12:
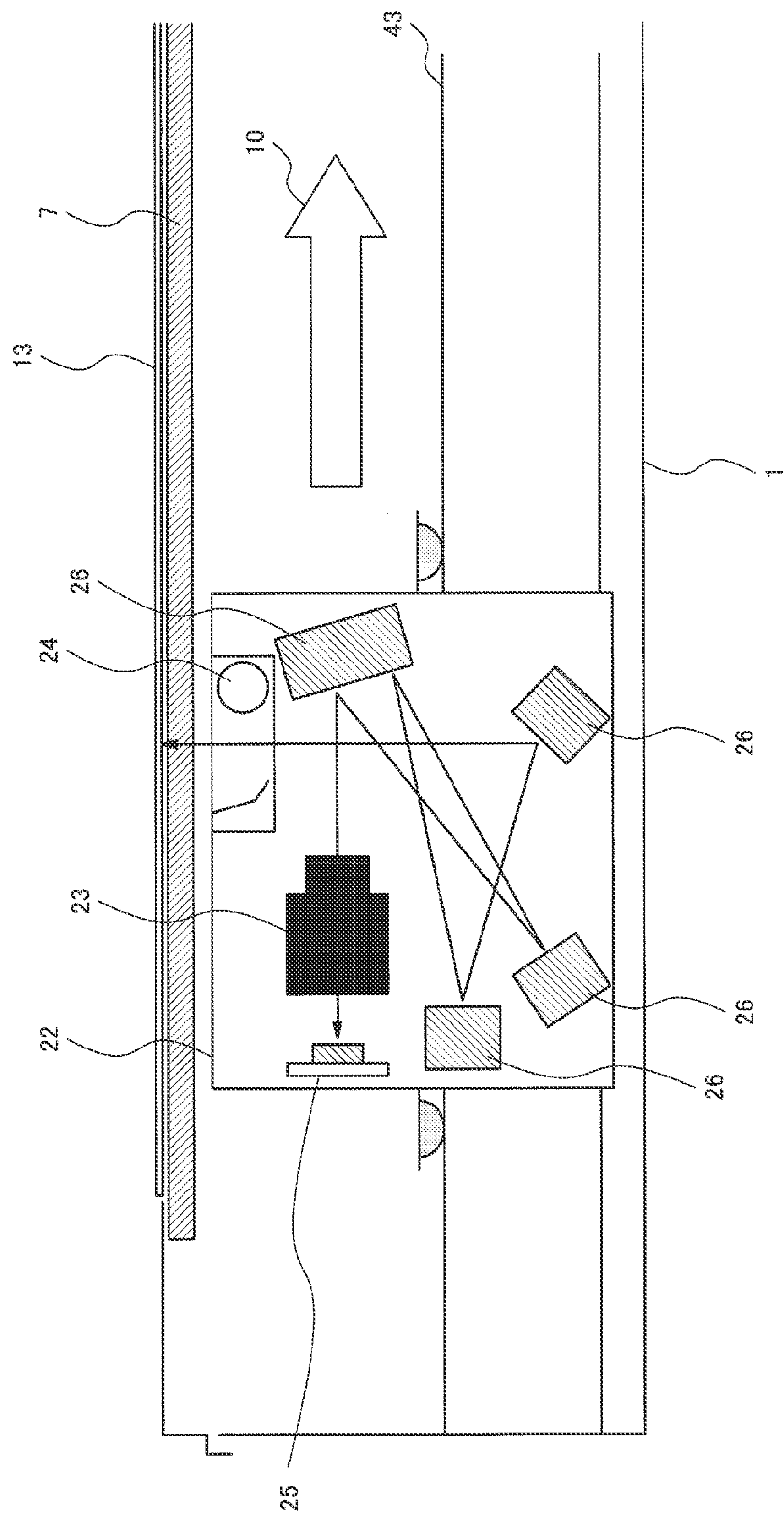
FIG. 12 is a figure showing an internal mechanism of an original document size detection device.
Figure 13:
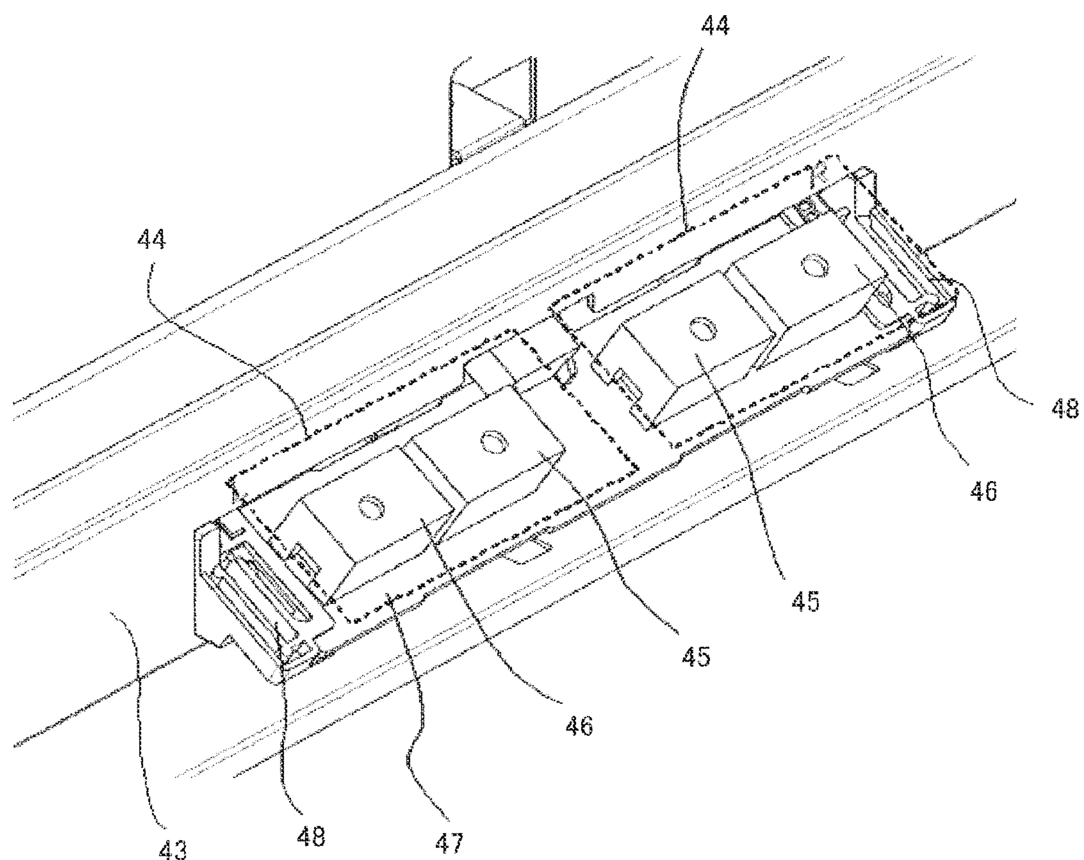
FIG. 13 is a figure showing a method for mounting a reflection type size sensor.
Figure 14:
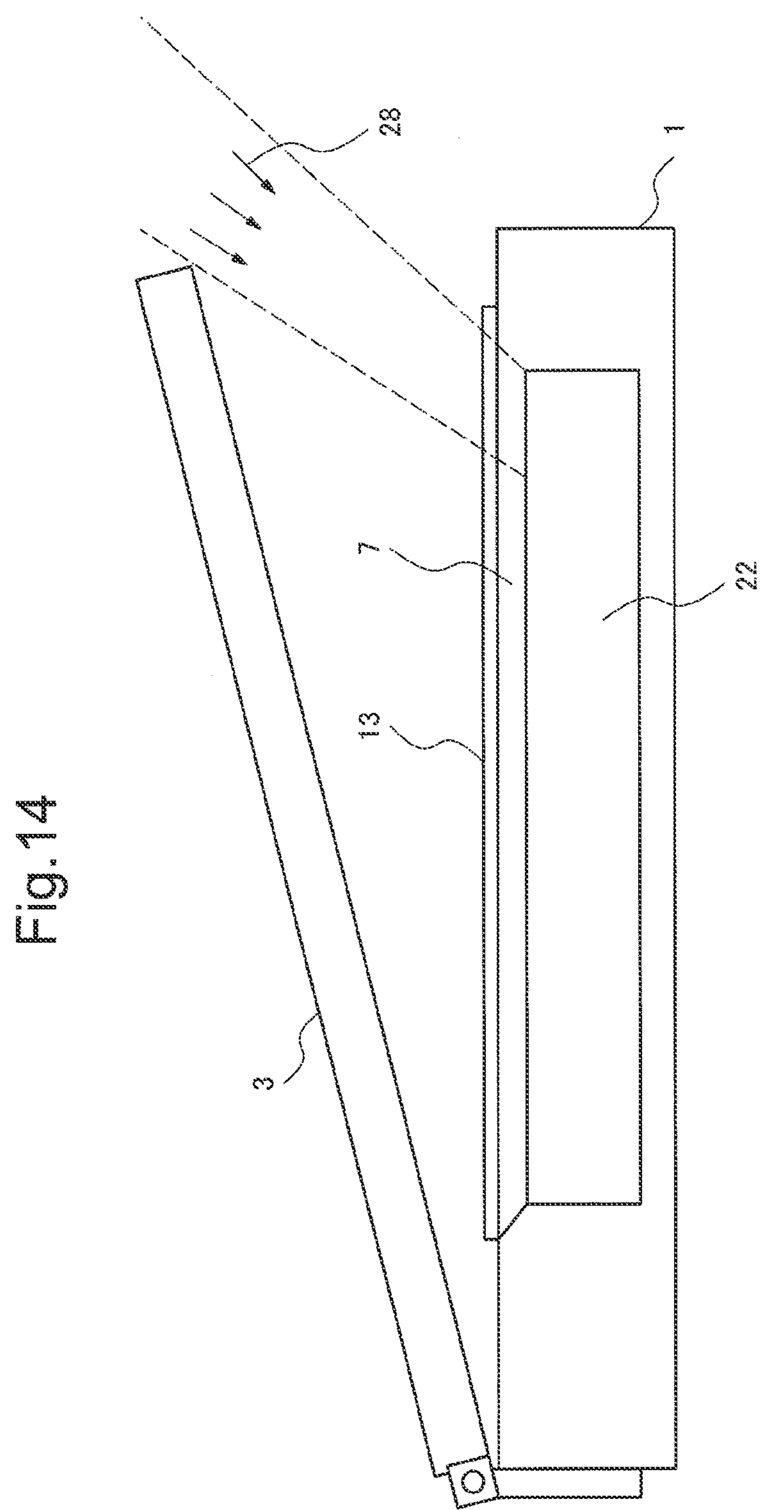
FIG. 14 is an explanatory drawing showing an external light entering a surface of a document reading table of an original document size detection device when a cover body is closed.

When the cover body 3 is completely closed (the cover body opening angle is 0 degree), the shield plate 35 and the transmissive photo sensor 32 are disposed (arranged) so that the positional relationship shown in FIG. 9 is obtained. Namely, because the light of the first photo sensor 32*a* passes through the notch of the shield plate 35*a*, the first photo sensor 32*a* remains in the light receiving state and the second photo sensor 32*b* still remains in the light shielding (blocking) state by the shield plate 35*bc*. However, the state of the third photo sensor 32*c* that has been in the light receiving state is changed to the light shielding (blocking) state by the shield plate 35*bc*.

As a result, the first transmissive photo sensor 32*a*, the transmissive second photo sensor 32*b*, and the third transmissive photo sensor 32*c* are set to a state (Low (light receiving state) or High (light shielding state)) according to the operation table of FIG. 2A by two shield plates 35 (35*a* and 35*bc*) that move upward and downward together with the rod 34 that moves upward and downward in conjunction with the closing angle (the opening angle) of the cover body 3. In the above-mentioned specific example that is composed of three photo sensors 32*a*, 32*b*, and 32*c* and two shield plates 35*a* and 35*bc*, the angle $\alpha\mathbf{1}$ of 18 degrees and the angle $\alpha\mathbf{2}$ of 12 degrees are used. After the original document 13 is placed on the document reading table 7, the cover body 3 is closed. At the time of starting to close the cover body 3, the positional relationship between three photo sensors 32*a*, 32*b*, and 32*c* and two shield plates 35*a* and 35*bc* is shown in FIG. 6. At this time, the shield plates 35*a* and 35*bc* do not reach the positions of the photo sensors 32*a*, 32*b*, and 32*c*. Accordingly, in all the photo sensors 32*a*, 32*b*, and 32*c*, the light reception unit receives the light emitted by the light emission unit. In this state, the output of the photo sensors 32*a*, 32*b*, and 32*c* is "Low". The output remains in the "Low" state (in all the photo sensors 32*a*, 32*b*, and 32*c*, the light reception unit receives the light emitted by the light emission unit) until the opening angle (the closing angle) of the cover body 3 becomes equal to 18 degrees.

When the opening angle (the closing angle) of the cover body 3 reaches 18 degrees, the lower end of the shield plate 35*a* blocks the light emitted by the light emission unit of the photo sensor 32*a* (refer to FIG. 7). By this, the output of the first photo sensor 32*a* is changed (switched) from "Low" to "High". However, in the second photo sensor 32*b* and the third photo sensor 32*c*, because the shield plate 35*bc* does not block the light emitted by the light emission unit of each of the photo sensors 32*b* and 32*c*, the light emitted by the light emission unit is received by the light reception unit of each of the photo sensors 32*b* and 32*c*. Accordingly, the output of the photo sensor 32*b* and the output of the photo sensor 32*c* are still "Low". When the output of the second photo sensor 32*b* and the output of the third photo sensor 32*c* are "Low" and the output of the first photo sensor 32*a* changes from "Low" to "High", the opening angle (the closing angle) of the cover body 3 is equal to the angle $\alpha\mathbf{1}$ (for example, 18 degrees). The cover body 3 is further closed. The output state of each of three photo sensors 32*a*, 32*b*, and 32*c* is the same as the output state when the opening angle (the closing angle) of the cover body 3 is equal to the angle $\alpha\mathbf{1}$ (for example, 18 degrees) until the opening angle (the closing angle) of the cover body 3 reaches the angle $\alpha\mathbf{2}$ (for example, 12 degrees).

When the opening angle (the closing angle) of the cover body 3 reaches the angle $\alpha\mathbf{2}$ (for example, 12 degrees), the light-shielding by the shield plate 35*a* is released. Namely, in the first photo sensor 32*a*, the light emitted by the light emission unit is received by the light reception unit. Accordingly, the output of the first photo sensor 32*a* is changed (switched) from "High" to "Low". When the opening angle (the closing angle) of the cover body 3 is equal to 12 degrees, the shield plate 35*bc* blocks the light emitted by the light emission unit of the photo sensor 32*b*. By this, the output of the second photo sensor 32*b* is changed (switched) from "Low" to "High". However, in the third photo sensor 32*c*, because the shield plate 35*bc* does not block the light emitted by the light emission unit of the photo sensor 32*c*, the light emitted by the light emission unit is received by the light reception unit of the photo sensor 32*c* (refer to FIG. 8). Accordingly, the output of the photo sensor 32*c* is still "Low".

The cover body 3 is further closed. The output state of each of three photo sensors 32*a*, 32*b*, and 32*c* is the same as the output state when the opening angle (the closing angle) of the cover body 3 is equal to 12 degrees before the cover body 3 is completely closed. When the cover body 3 has been completely closed, the output state of each of the first and second photo sensors 32*a* and 32*b* is not changed but in the third photo sensor, the light emitted by the light emission unit of the third photo sensor is blocked by the shield plate 35*bc* for the first time (refer to FIG. 9). Namely, the output of the third photo sensor is changed (switched) from "Low" to "High".

By using this mechanism, the transmissive photo sensor whose price is low can be used without using the expensive proximity switch. A magnet attached to the cover body 3 is not used. Further, because the transmissive photo sensors 32 are disposed at the rear side of the device, it is not necessary to extend a cable to the front side of the device. Because the short cable can be used, the cost of the device can be reduced. Moreover, a space or a structure required for installation of the proximity switch and the magnet that are provided at the front side of the image reading device is not required.

A hinge is used to open and close the cover body 3. It is desirable that a hinge shaft is disposed at one edge side of the document reading table 13 along the sub-scanning direction (the sub-scanning direction is perpendicular to the main scanning direction) of the original document 13. It is desirable that the above-mentioned shield plate 35 is disposed at the hinge shaft side end of the cover body.

The original document size detection device according to the present invention includes a movable optical module 22. The optical module 22 includes the light source 24 which irradiates the original document 13 placed on the document reading table 7 of an image reading device 1. The optical module 22 includes a plurality of mirrors 26 which reflects the light emitted by the light source 24 to lead it to a photoelectric conversion element (CCD) 25. The optical module 22 includes a lens 23. The lens 23 is disposed between the mirror 26 and the CCD 25, concentrates the light reflected by the mirror 26, and forms an image on the CCD 25. In order to move the optical module 22 in the sub-scanning direction 10, the optical module 22 is mounted on an upper portion of two rails 43 that are disposed in a sub-scanning direction 10. A wire 40 is connected to the both ends of the optical module 22. In order to move the optical module 22 in the sub-scanning direction 10 (it is perpendicular to a main scanning direction 11), a drum 41 around which the wire 40 is wound and a drive unit 42 which rotates the drum 41 are provided.

Two reflection type size sensors 44 are used for the detection of the size of the original document in the sub-scanning direction 10. The reflection type size sensor 44 is composed of a pair of units (a light emission unit 45 and a light reception unit 46). The reflection type size sensor 44 is held by two holders 48 fixed to the rail 43 that is a track for the optical module 22 in the image reading device 1. In particular, the reflection type size sensor 44 is obliquely fixed. Two reflection type size sensors 44 are mounted on a rectangular substrate 47 whose long side is along the sub-scanning 10 direction.

The CCD output waveform based on the light that is emitted by the light source 24 and reflected by the original document 13 is used for the detection of the size of the original document in the main scanning direction 11.

In the original document size detection device according to the present invention, a load on software control does not become especially large because the electric masking process is used. Because the data in the external light incident area is excluded by the masking, the influence of the external light is removed. The influence of the external light is removed by performing a few processes. Therefore, the accuracy of the original document detection is improved.

For example, in Japanese Patent Application Laid-Open No. 2006-261848 (hereinafter, patent document 4), as a method for detecting the size of the original document, a method in which when it is detected that the angle of the cover body reaches a specified angle, the light source is turned on by using this as a trigger, the detection operation is delayed for a predetermined time by a software-controlled timer until an amount of light emitted by the light source is equal to a specified amount of light, and when the predetermined time has elapsed, the reading is performed is proposed. However, even when this method is used, when the cover body is quickly closed by the operator, there is a case in which the reading for size detection starts after the cover body has been completely closed because of mismatch between the predetermined time of the timer and the cover closing speed. For this reason, there is a possibility that the false detection occurs. Further, the angle of the cover body at which the reading starts is not specified. Therefore, the angle of the cover body at which the reading starts is different for each operator because the cover body closing speed is different for each operator by individual variability. As a result, the result of the size detection varies. In the apparatus disclosed in patent document 4, only one angle can be set with respect to the angle of the cover body that is used as the trigger of the operation.

In contrast, in the device according to the present invention, a plurality of angles of the cover body 3 that are used as the trigger can be set. Namely, the cover body opening angle at which the light source 24 is turned on and the cover body opening angle at which the reading for size detection is performed can be individually set. Therefore, the timing at which the light source 24 is turned on and the timing at which the reading is performed can be controlled separately. Because the operations are started at different timings, in other words, the operations are started at different cover body opening angles, the reading can be performed at the predetermined timing without relation to operator's lid closing speed. As a result, the accuracy of the original document size detection is improved.

It has been described above that the cover body closing speed is different for each operator by individual variability. In order to respond to various cover body closing speeds, the angle detection is performed in an interrupt processing for detecting a moment at which a signal of an angle sensor is switched. A method in which one angle detection sensor is provided for each angle to be detected and a moment at which each angle detection sensor is switched is detected is known. However, in order to perform the interrupt processing, it is necessary to set an interrupt detection port at an initial stage of designing a substrate. Because the total number of ports which can be set in the CPU is limited and the number of ports required by the other function increases with the increase of the number of functions provided for the device, the interrupt detection port cannot be additionally provided. For this reason, when the necessity of increasing or decreasing the number of the original document size detection angles occurs, this cannot be achieved. There is a possibility that the size of the original document is erroneously detected.

The device according to the present invention uses the rod with the shield plate 35 for example, as shown in FIG. 3. By this, the trigger for angle detection is concentrated on only one photo sensor 32*a* and the number of the interrupt detection ports is reduced by one. A signal is switched with respect to the cover body opening angle at which the original document size detection is performed and when the interrupt processing is performed, the cover body opening angle is determined based on the operation table of FIGS. 2A and 2B. The number of the cover body opening angles that have to be detected can be increased or decreased and whereby, the size of the original document can be surely detected.

Next, the operation of the original document size detection device according to the present invention will be described in detail. The detection of the size of the original document is performed by using the opening angle (the closing angle) a of the cover body 3 as a trigger. When the lifted cover body 3 is completely closed ($\alpha$=0 degree), the following operations (1) to (5) are performed: (1) the cover body is lifted, (2) the light source is turned on ($\alpha$=18 degrees), (3) the size of the original document in the sub-scanning direction is detected ($\alpha$=18 degrees), (4) the size of the original document in the main scanning direction is detected ($\alpha$=12 degrees), and (5) the cover body is completely closed ($\alpha$=0 degree). The angle $\alpha$ is detected by the mechanism for detecting the angle of the cover body 3 that is composed of three transmissive photo sensors 32*a*, 32*b*, and 32*c* and the actuator unit 33 (especially, two shield plates 35*a* and 35*bc*) and the above-mentioned operations (1), (2), (3), (4), and (5) are performed in order.

The above-mentioned operation (1) will be described in more detail. When the cover body 3 is sufficiently lifted, the rod 34 of the actuator unit 33 is not pressed by the cover body 3. At this time, because three transmissive photo sensors 32*a*, 32*b*, and 32*c* are in the "light receiving state", the cover body 3 is in a state shown as "cover body opening angle >$\alpha$1 (for example, 18 degrees)" in FIG. 2A. Therefore, the CPU determines that the cover body 3 is lifted.

After this, when the cover body 3 is closed, by the shield plates 35*a* and 35*bc* fixed to the rod 34 that moves in conjunction with the cover body 3, three transmissive photo sensors 32*a*, 32*b*, and 32*c* are set to a state indicated in the column "cover body opening angle=$\alpha$1 (for example, 18 degrees)" of the operation table in FIG. 2A. The CPU receives the output information on three transmissive photo sensors 32*a*, 32*b*, and 32*c* when the cover body opening angle is equal to the angle $\alpha$1 (for example, 18 degrees) and determines that the opening angle (the closing angle) of the cover body 3 is equal to the angle $\alpha$1 (for example, 18 degrees). The CPU uses this as the trigger and turns on the light source 24.

The size of the original document in the sub-scanning direction 10 is detected by using the turn-on of the light source 24 as the trigger. Namely, the size of the original document in the sub-scanning direction 10 is detected based on the output signals of two size sensors 44. The method for detecting the size of the original document in the sub-scanning direction 10 is same as the conventional one. Therefore, the detailed explanation will be omitted.

After this, when the cover body 3 is further closed, by the shield plates 35*a* and 35*bc* fixed to the rod 34 that moves in conjunction with the cover body 3, three transmissive photo sensors 32*a*, 32*b*, and 32*c* are set to a state indicated in the column "cover body opening angle=$\alpha$2 (for example, 12 degrees)" of the operation table in FIG. 2A. The CPU receives the output information on three transmissive photo sensors 32*a*, 32*b*, and 32*c* when the cover body opening angle is equal to the angle $\alpha$2 (for example, 12 degrees) and determines that the opening angle (the closing angle) of the cover body 3 is equal to the angle $\alpha$2 (for example, 12 degrees).

Figure 16:
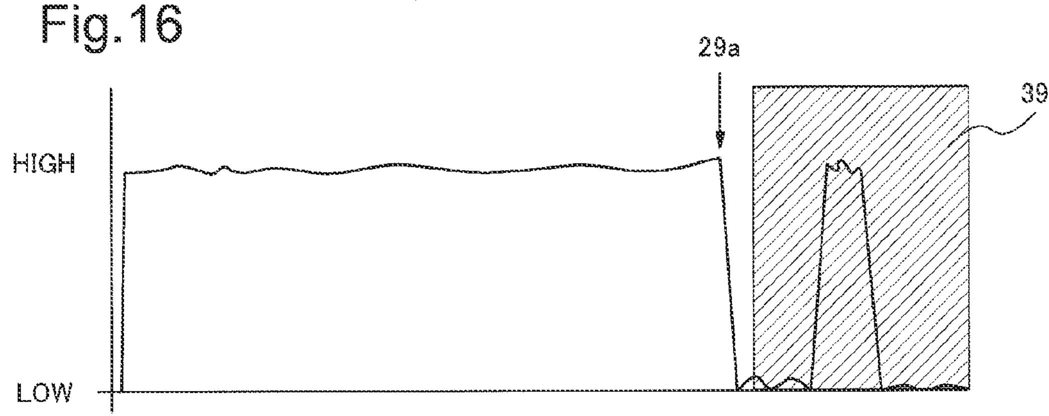
FIG. 16 shows a CCD output when an external light enters a surface of a document reading table of an original document size detection device.

The CPU uses this as the trigger and determines the state of the CCD output waveform 29 of the light that is emitted by the light source 24 that is turned on when the opening angle (the closing angle) of the cover body 3 is equal to the angle $\alpha 1$ (for example, 18 degrees) and reflected by the original document 13. When the opening angle (the closing angle) of the cover body 3 is equal to the angle $\alpha 2$, the cover body 3 is not completely closed. Therefore, the external light 28 enters a reading area on the surface of the document reading table. Accordingly, the CCD 25 receives both the light reflected by the original document 13 and the external light 28 and outputs the combined information. As shown in FIG. 15, the combined information (CCD output waveform) includes a convex waveform 30 caused by the external light 28. However, in the device according to the present invention, the masking unit 4 performs the electric masking process and the convex waveform 30 is masked as shown in FIG. 16. The CPU determines that the output waveform end portion 29*a* in the "High" state corresponds to the edge of the original document in the main scanning direction 11. As a result, the size of the original document in the main scanning direction 11 can be known.

Figure 17:
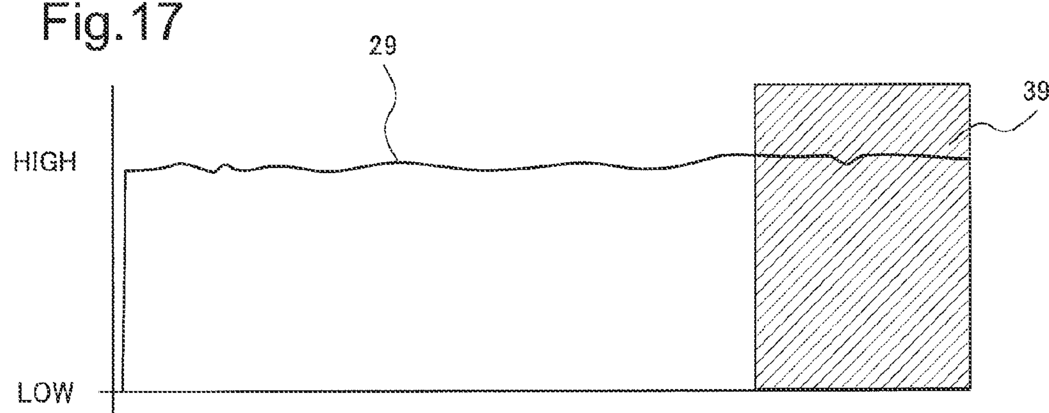
FIG. 17 shows a CCD output when an external light enters a surface of a document reading table of an original document size detection device.

However, as shown in FIG. 17, there is a case in which the output waveform end portion in the "High" state is included in the masking area. In such case, the CPU determines that the size of the original document in the main scanning direction 11 is maximum. Namely, by performing the electric masking process, the influence of the external light is prevented and the erroneous detection of the size of the original document caused by the external light 28 does not occur. Further, when detecting the output waveform end portion 29*a*, the scanning is performed from the right end side (the masking area side) in a figure showing the CCD output waveform. That is because the detection time can be shortened.

After this, when the cover body 3 is further closed, by the shield plates 35*a* and 35*bc* fixed to the rod 34 that moves in conjunction with the cover body 3, three transmissive photo sensors 32*a*, 32*b*, and 32*c* are set to a state indicated in the column "cover body opening angle=0 degree" of the operation table in FIG. 2A. At this time, the CPU determines that the cover body 3 is completely closed.

The operation effect of the original document size detection device according to the present invention is shown below.

The size of the original document in the main scanning direction 11 is detected as follows. For example, the edge of the original document is discriminated by using the CCD output waveform. At this time, because the external light is not completely blocked by the cover body 3, there is a case in which the external light 28 such as the light of a fluorescent lamp, the light of the sun, or the like may enter the CCD. The CCD output waveform is affected by this external light 28. As a result, the erroneous detection of the size of the original document occurs. Therefore, the masking unit 4 performs the masking process (for example, the electric masking process) to the CCD output waveform corresponding to an area in which the external light 28 enters. Namely, even when the external light 28 enters, when the determination unit 5 determines the size of the original document, a region in which the CCD output waveform varies by the external light 28 is excluded. As a result, the size of the original document can be determined without being affected by the external light 28.

For example, the image reading device such as a facsimile machine, a copier, or the like usually uses a short focus lens having a short optical path length from a viewpoint of weight reduction, miniaturization, space saving, and cost reduction. The short focus lens is used in the device according to the present invention. Because the short focus lens has a wide field angle, the view angle of the optical module is wide. This means that the detection of the size of the original document is affected by the external light (for example, the light of a fluorescent lamp provided on a ceiling or the light of the sun) 28 which cannot be blocked by the cover body 3 when the cover body 3 is being closed. In other words, the external light 28 which is not blocked by the cover body 3 enters the surface of the document reading table 7. When the size of the original document in the main scanning direction 11 is detected in this state, the waveform (the convex waveform) caused by the external light 28 is generated in the CCD output waveform when the original document 13 does not exist in an area which the external light 28 enters and whereby, it is erroneously determined that the position of the convex waveform end is the position of the edge of the original document 13. Namely, the position of the edge of the original document 13 cannot be correctly detected.

To solve this problem, extension of the cover body 3 in a direction toward a front side of the device (user side) may be performed. Namely, when the cover body 3 is extended in a direction toward the front side (user side) of the device, because the external light 28 does not enter the surface of the document reading table even when the cover body 3 is being closed, the erroneous operation hardly occurs. However, when this method is used, the size of the device becomes large. Accordingly, the masking unit 4 performs the electric masking process for masking the output waveform in an area that corresponds to the area on the surface of the document reading table which the external light 28 enters. By this, the size of the original document can be correctly detected even when the cover body 3 is not extended in the direction toward the front side of the device (user side), in other words, even when the external light 28 enters the surface of the document reading table 7. By this process, the convex waveform is electrically eliminated and the detection of the size of the original document is not affected by the external light 28.

The electric masking process is applied to the output signal in an area that corresponds to an area between a position between the edge of the original document having the maximum width in the main scanning direction and the edge of the original document having a width that is one size smaller than the maximum width and a maximum reading position in the main scanning direction. Namely, the opening angle (the closing angle) of the cover body 3 when the size of the original document in the main scanning direction is detected is set so that the output signal due to the external light is masked by the electric masking process. When the electric masking process is applied to the output signal in the above-mentioned area and the output signal does not remain in the High state in the masking area, it is determined that the size of the original document in the main scanning direction is a size corresponding to a position at which the output signal changes from the High state to the Low state. When the output signal remains in the High state in the masking area, the edge of the original document cannot be discriminated. Accordingly, in this case, it is determined that the size of the original document is maximum. When the original document size detection device is configured as described above, it is not necessary to extend the cover body 3 in the direction toward the front side of the device. Therefore, the size of the device can be reduced. All sizes of the original documents can be detected without being affected by the external light 28.

Namely, an exemplary advantage according to the invention is that the size of the original document in a main scanning direction can be easily and correctly determined.

The previous description of embodiments is provided to enable a person skilled in the art to make and use the present invention. Moreover, various modifications to these exemplary embodiments will be readily apparent to those skilled in the art, and the generic principles and specific examples defined herein may be applied to other embodiments without the use of inventive faculty. Therefore, the present invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

What is claimed is:

1. An original document size detection device comprising:

a document reading table, a light source which irradiates an original document placed on the document reading table, a cover body which covers the original document, a light detection unit which detects a reflected light which is a light from the light source reflected by the original document and an external light that enters a surface of the document reading table when the cover body is lifted, a masking unit which masks an output signal based on the external light in an output signal of the light detection unit based on the reflected light and the external light, and a determination unit which determines a size of the original document in a main scanning direction based on the output signal of the light detection unit that is masked by the masking unit, wherein the determination unit determines that the size of the original document in the main scanning direction is maximum when the output signal of the light detection unit that is masked by the masking unit remains in a High state in a masking area and the size of the original document in the main scanning direction is a size corresponding to a position at which the output signal changes from the High state to a Low state when the output signal of the light detection unit that is masked by the masking unit does not remains in the High state in the masking area.

2. An original document size detection device comprising:

a document reading table, a light source which irradiates an original document placed on the document reading table, a cover body which covers the original document, a light detection unit which detects a reflected light which is a light from the light source reflected by the original document and an external light that enters a surface of the document reading table when the cover body is lifted, a masking unit which masks an output signal based on the external light in an output signal of the light detection unit based on the reflected light and the external light, and a determination unit which determines a size of the original document in a main scanning direction based on the output signal of the light detection unit that is masked by the masking unit, wherein the masking unit is means for masking an area of the output signal that corresponds to an area between a position between a maximum width of the original document in the main scanning direction and a width of the original document having a size that is one size smaller than the maximum width and a maximum reading position in the main scanning direction.

* * * * *

UNITED STATES PATENT AND TRADEMARK OFFICE

CERTIFICATE OF CORRECTION

PATENT NO. : 8,634,083 B2
APPLICATION NO. : 13/586426
DATED : January 21, 2014
INVENTOR(S) : Masaya Igawa et al.

It is certified that error appears in the above-identified patent and that said Letters Patent is hereby corrected as shown below:

In the Specification:

Column 12, Line 12: Delete "a of" and insert -- α of --

Signed and Sealed this
Twenty-fifth Day of November, 2014

Michelle K. Lee
*Deputy Director of the United States Patent and Trademark Office*